(12) United States Patent
Wallin

(10) Patent No.: US 7,937,236 B2
(45) Date of Patent: May 3, 2011

(54) METHOD AND A SYSTEM FOR ADAPTIVE COMPENSATION OF THE TEMPERATURE DRIFT OF A SENSOR

(75) Inventor: Christer Wallin, Västerås (SE)

(73) Assignee: ABB AB, Väterås (SE)

( * ) Notice: Subject to any disclaimer, the term of this patent is extended or adjusted under 35 U.S.C. 154(b) by 305 days.

(21) Appl. No.: 11/794,570

(22) PCT Filed: Dec. 30, 2005

(86) PCT No.: PCT/SE2005/002063
§ 371 (c)(1),
(2), (4) Date: Oct. 5, 2009

(87) PCT Pub. No.: WO2006/071195
PCT Pub. Date: Jul. 6, 2006

(65) Prior Publication Data
US 2010/0017164 A1   Jan. 21, 2010

(30) Foreign Application Priority Data

Dec. 30, 2004 (SE) ........................................ 0403229

(51) Int. Cl.
*G06F 19/00* (2011.01)
*G01L 25/00* (2006.01)
(52) U.S. Cl. ...................... 702/104; 73/862.335; 702/99
(58) Field of Classification Search .................... 702/99, 702/104, 106, 116, 119, 130; 73/54.16, 862.335, 73/662.622, 862.623; 331/176
See application file for complete search history.

(56) References Cited

U.S. PATENT DOCUMENTS

| | | | |
|---|---|---|---|
| 5,307,690 A | 5/1994 | Hanazawa | |
| 5,412,998 A | 5/1995 | Nakamoto et al. | |
| 6,658,345 B2 | 12/2003 | Miller | |
| 7,548,130 B2 * | 6/2009 | Kobayashi | 331/176 |

FOREIGN PATENT DOCUMENTS

EP    1283414 A2    2/2003

OTHER PUBLICATIONS

PCT/ISA/210—International Search Report—Apr. 6, 2006.
PCT/IPEA/409—International Preliminary Report on Patentability—May 8, 2007.

* cited by examiner

*Primary Examiner* — John H Le
(74) *Attorney, Agent, or Firm* — Venable LLP; Eric J. Franklin

(57) ABSTRACT

A method for adaptive compensation of a temperature drift of a sensor, designed to measure the torque of a shaft or a drive train or the force in mechanical equipment during operation. A sensor signal is recurrently measured. An associated temperature is determined. An offset value is calculated as a function of temperature based on measured and stored data. The measured signal value is compensated using the calculated offset value. When the sensor is unloaded or nearly unloaded is detected. When the sensor is unloaded or nearly unloaded the signal sensor signal value and the associated temperature value are stored in a memory and a model of the sensor offset is updated. A system and computer program product for adaptive compensation of the temperature drift of such a sensor signal offset.

16 Claims, 11 Drawing Sheets

METHOD AND A SYSTEM FOR ADAPTIVE COMPENSATION OF THE TEMPERATURE DRIFT OF A SENSOR

CROSS-REFERENCE TO RELATED APPLICATIONS

This application claims priority to Swedish patent application 0403229-8 filed 30 Dec. 2004 and is the national phase under 35 U.S.C. §371 of PCT/SE2005/002063.

FIELD OF THE INVENTION

The present invention relates to a method and a system for adaptive compensation of the temperature drift of a sensor in a mechanical equipment, and preferably for a torque sensor designed for a shaft driven by a motor/engine in a process, a production line or a vehicle.

More specifically the invention concerns a compensation system for minimizing offset variations in a torque sensor in an automotive power train.

BACKGROUND OF THE INVENTION

Due to increasing levels of traffic pollution caused by vehicle exhaust emissions, new government legislations for lower exhaust emission limits, customer demands for lower fuel consumption and increased smoothness of the transmission there is a pressing need to improve the efficiency of engines and transmissions. Also in the field of motor sport the competition is very high and it is of utmost importance to apply the best technology for the race car engines and their drive trains.

Electronic control systems for combustion engines include a number of sensors and systems for determining various engine operating conditions. Many of these sensors are working in harsh environments and are subjected to widely varying operating conditions and the requirements on a sensor are very demanding in terms of durability, long term stability and the ability to operate over a large temperature range. Typical temperature ranges that are encountered in automotive applications range from −40° C. up to +150° C. In this temperature range it is required that the sensor produces a reliable output signal throughout its entire life.

One solution to the problem of temperature stability is to design a sensor that is sufficiently stable throughout the temperature range and throughout the lifetime of the sensor. The problem with such a sensor is that it is either too costly to produce for automotive purposes or too bulky to integrate in the power train.

Another solution is to add a temperature calibration step in the production where the temperature characteristics of the sensor are compensated by adjustments of the sensor or in the electronics. Since this operation has to be performed on each individual sensor in production this adds extra cost to the component.

A further complication is that a torque sensor for automotive applications is usually for practical reasons designed by two separate parts, where one part is the load carrying shaft and the other part is a surrounding yoke, which parts are combined first when the sensor is mounted on the gear box. A temperature calibration step of the offset drift of the sensor has to be performed on the complete sensor and can not be done on the separate parts. A further problem with the temperature calibration solution is that it does not account for long term effects on temperature characteristics.

A straightforward way to calibrate the sensor offset in the application is to perform a zero reset of the sensor during gearshifts, when the drive train is unloaded. A limitation of that approach is that the zero reset is only valid at that particular temperature level. When the temperature changes a new zero reset/calibration has to be performed in order to achieve reliable sensor data.

U.S. Pat. No. 6,658,345 describes how the temperature characteristics of a sensor can be compensated after installation in an application. A problem with this approach is that it requires the input of a separate temperature sensor. It further relies on a key switch for start and stop and can only update the sensor model at start or stop of the engine.

SUMMARY OF THE INVENTION

The object of the present invention is to solve the problems indicated above and to provide a method and a system that effectively compensate the temperature dependence of the sensor signal value using a calculated offset value and thereby improving the value of the sensor signal.

A further important object of the present invention is to provide such automotive components at a low cost.

These and other objects are achieved according to the present invention by a method, a system, and a computer program product.

The invention uses naturally occurring operation points of the application in which the loading state of the shaft or drive train and the sensor are known. Sensor data from these operation points are stored in a memory/database and are used to update a model of the sensor characteristics. Such operation points that are readily available occur during gearshift when a drive train is disengaged and the sensor is known to be unloaded or at least close to unloaded.

Sensor data and temperature data are collected, after suitable filtering, when the shaft or drive train is unloaded and is used as information about the sensor offset at that particular temperature. When data from at least two temperature levels is collected this information is used to determine parameters in a sensor model that describe the temperature dependence of the sensor offset. The sensor model is used to continuously calculate the sensor offset based on the temperature signal.

A temperature signal is preferably obtained from the sensor excitation/supply unit by measuring changes in the electrical properties of the sensor, but can also be obtained from an external temperature sensor or by other means from the supervising system. Information about when the drive train or the sensor is unloaded can be obtained in several different ways. In the case of an automatic transmission or an automated manual transmission a signal can be obtained from the supervising system when the drive train is disengaged. For a manual transmission a signal can be obtained from a switch position of the clutch pedal and/or the shift lever. This signal can also be obtained by monitoring specific characteristics of the torque signal.

In a further embodiment of the invention a trigger signal for a disengaged drive train can be achieved by analyzing characteristics of the sensor signal such as the sudden change in derivative of the sensor signal or the amplitude of the torque ripple information that both changes when the torque sensor is structurally disengaged from the drive train, due to play in the transmission.

The most important feature of the invention is to use operation points, at least two, when the drive train is unloaded/disengaged in order determine/update a model of the temperature dependence of the sensor offset.

Another important feature of the invention is to use the electrical properties of the sensor as a measure of the operating temperature which eliminates the need of an external temperature sensor.

A further important feature of the invention is to analyze the characteristics of the sensor signal in order to obtain a trigger signal for a disengaged drive train.

The primary advantage of the invention is that the temperature characteristic of the sensor is greatly enhanced without the need for a costly or difficult temperature calibration step in the manufacturing process. The adaptation scheme is performed during operation in the application. Furthermore the temperature performance of the sensor is guaranteed to be maintained throughout the lifetime of the sensor.

Other objects, features, and advantages of the invention will become evident in light of the following detailed description considered in conjunction with the enclosed drawings and defined by any of the dependent claims.

BRIEF DESCRIPTION OF DRAWINGS

For better understanding of the present invention, reference will be made to the accompanying drawing.

DESCRIPTION OF PREFERRED
EMBODIMENTS OF THE INVENTION

Figure 1:
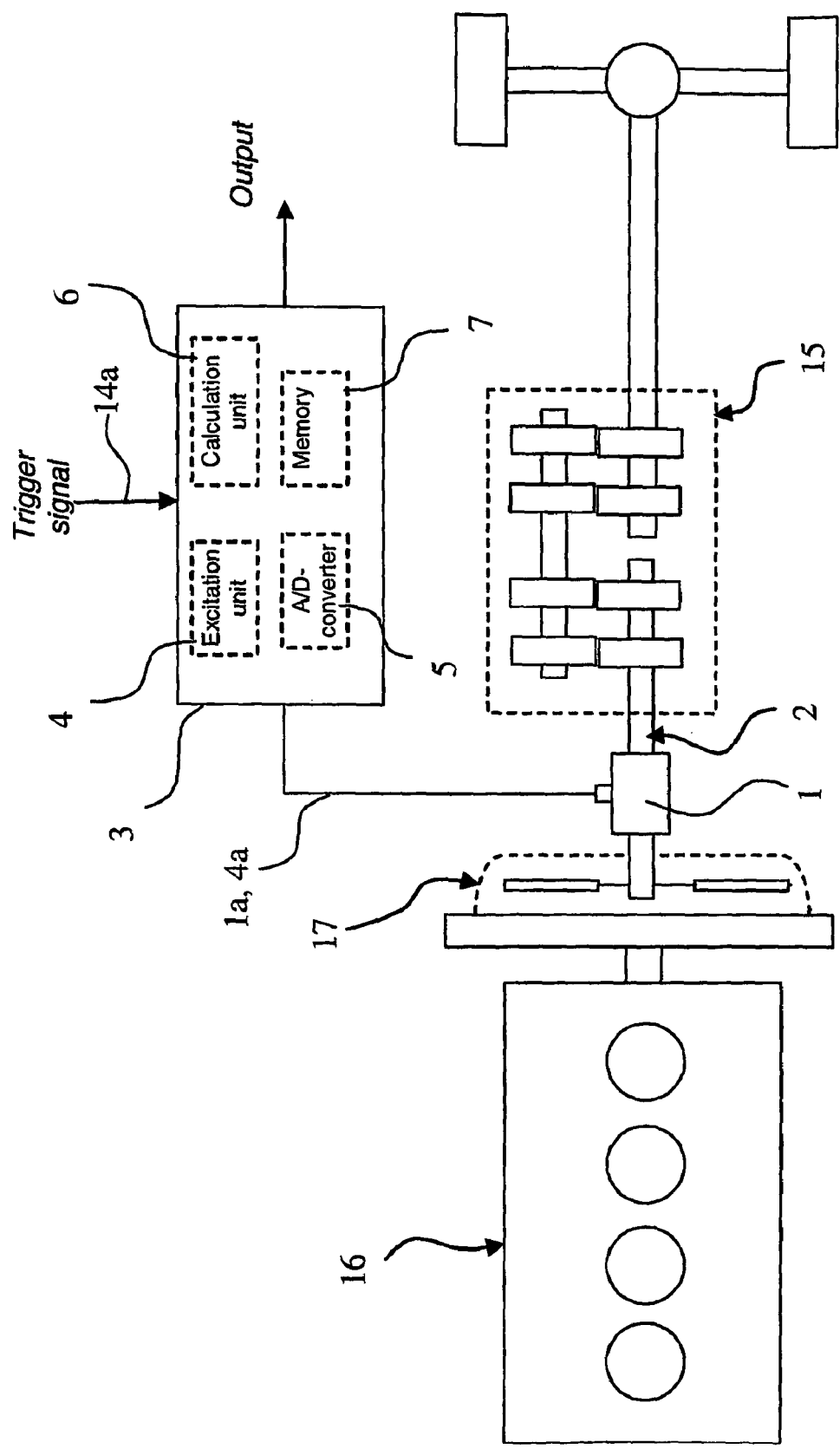
FIG. 1 is a schematic block diagram and gives an overview of the preferred embodiment of the invention.

The preferred embodiment of the invention consists, as illustrated in FIG. 1, of a torque sensor 1 that is located in the drive train 2 of a vehicle. The torque sensor 1 is electrically connected to an electronic unit 3 consisting of an excitation unit 4, an A/D-converter 5, a calculation or processing unit 6 and a memory 7.

The electronic unit 3 is connected to a gearbox control unit, not shown, that controls/operates a mechanical clutch 17 in the drive train 2. When the mechanical clutch 17 is disengaged the state of the drive train 2 is known to be unloaded. This can also be achieved by other means which will be discussed later.

Figure 2:
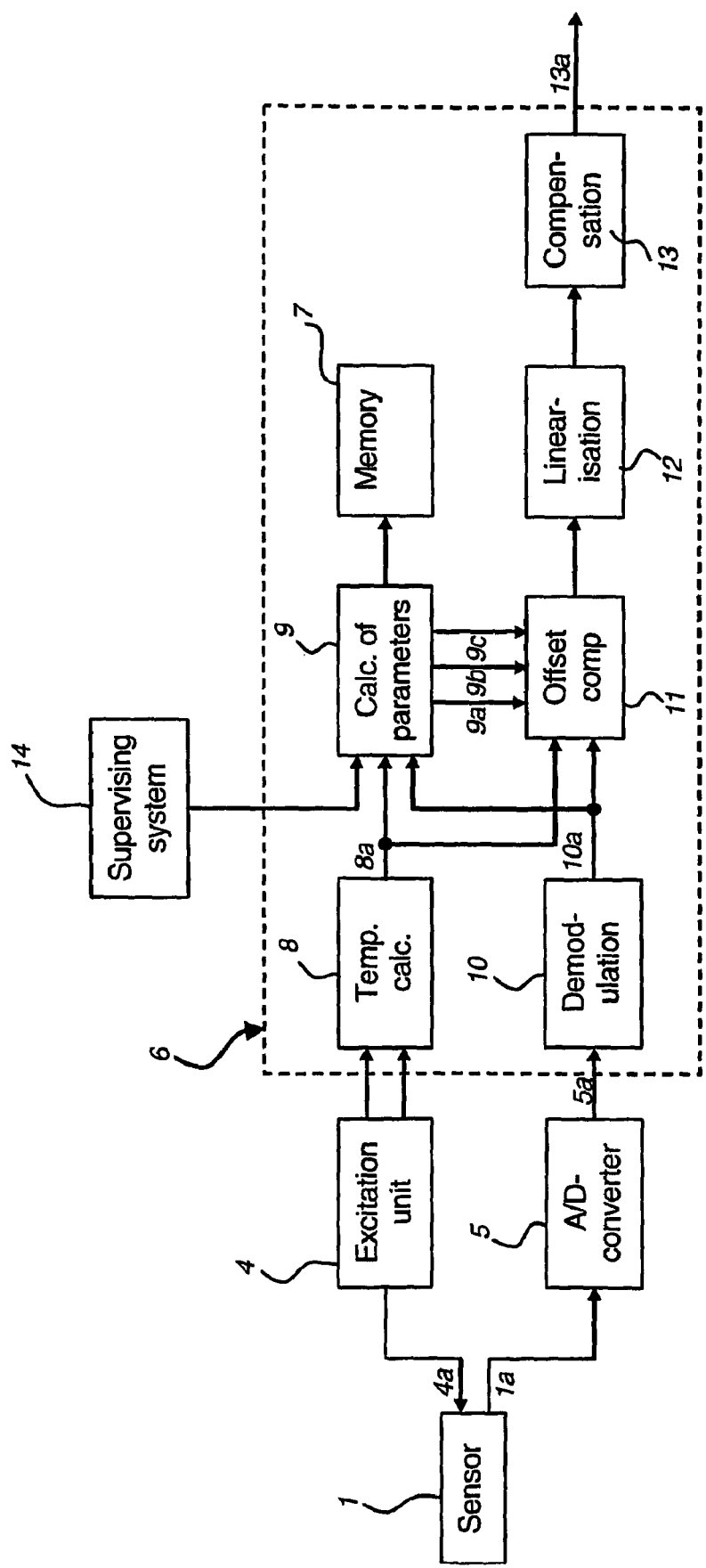
FIG. 2 illustrates a signal processing and block diagram according to the invention.

As can be seen in FIG. 2 the sensor 1 is supplied with an excitation signal 4a from the excitation unit 4 and the sensor 1 produces an output signal 1a that is sampled by the A/D-converter 5. The digital signal 5a from the A/D-converter 5 is processed by the calculation unit 6 in order to obtain a linear and temperature stable output indicative of the torsional load of the torque sensor 1. The calculation unit 6 further comprise a temperature calculation unit 8, a parameter calculation unit 9, a demodulation unit 10, an offset compensation unit 11, a linearization unit 12 and an output compensation unit 13.

The demodulation unit 10 in FIG. 2 consists of filtering and decimation of the signal 5a synchronised with the excitation signal 4a. It may also consist of further filtering and processing in order to improve noise and stability of the demodulated signal 10a.

In the preferred embodiment a temperature signal is determined based on characteristics of the primary circuit of sensor 1. The temperature signal is used by the calculation unit 6 to compensate the temperature drift of the sensor 1 based on a mathematical model, e.g. stored in the memory 7.

When it is known from a supervising system 14, e.g. a gearbox control unit that the drive train 2 is unloaded sensor signal data/values and temperature signal data/values are collected and stored in the memory 7. Data from zero load conditions gathered at several, at least two, different temperature levels form a database that is used to recurrently update the sensor model. Zero load state is indicated in FIG. 1 as a trigger signal 14a from the supervising system 14.

The output signal of the calculation unit 6 can be transferred to and used by the gearbox control unit (not shown) in order to optimise the gearshifts, detect wear of transmission components and so on, but it can also be used by an engine management system in order to diagnose, control and optimize the engine 16.

Based on the data monitored and collected for a number of different temperature levels parameters 9a,9b,9c are calculated that describe the temperature drift of the sensor offset. The further processing of the sensor signal is done, among others, in a linearization unit 12 and an output compensation unit 13 and includes a possible compensation of the sensitivity/gain drift of the sensor 1, further filtering and/or adaption of output levels of the resulting output signal 13a. One specific operation point of the application that is used by the invention is during gearshift when the drive train 2 is unloaded.

Figure 3:
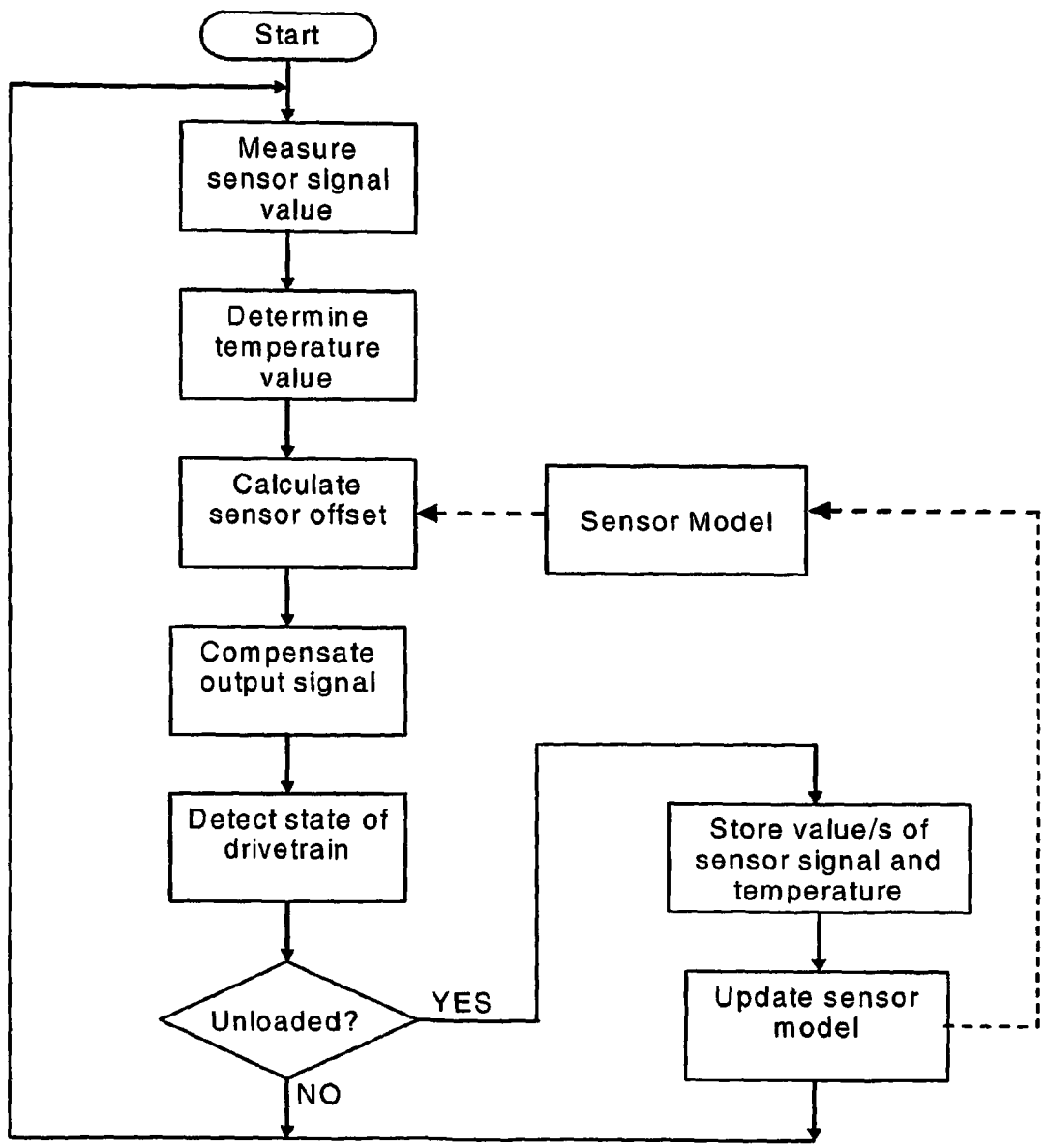
FIG. 3 is a flow chart of the invention.

A flowchart that describes the method according to the invention is shown in FIG. 3 and consists of one part that runs continuously, left side, and compensates the temperature offset of the sensor signal. The other part of the flow is run when the drive train is known to be unloaded, right side.

The first part of the flow consists of the steps of measuring a signal value from the sensor which means that the secondary signal of the sensor is converted into a digital signal indicative of the torsional load. This step may consist of the steps of an A/D-conversion and also a demodulation of the signal that can be either in the digital or the analogue domain. A second step of the flow consists of determining a temperature value, which in the preferred embodiment is achieved by measuring the change in impedance of the primary circuit of the sensor. By knowing the relation between impedance and temperature a temperature value can thus be determined. In a third step the temperature value is used to calculate the temperature offset of the sensor at this particular temperature. This is done based on a relation between temperature and sensor offset that is stored in a database in the electronic unit. In a fourth step the calculated value of the sensor offset is used to compensate the output signal of the sensor thereby obtaining a temperature compensated output signal. In the fifth and final step of the continuous part of the flow the state of the drive train is detected.

If the drive train is found to be unloaded the present values of the sensor signal and the temperature signal are stored in a memory/database. In order to improve the quality of the stored values this step may consist of an optional filtering of the temperature and sensor signals. In the next step the new values in the database, together with values measured previously, are used to determine the relation between temperature values and sensor offset values. This relation is the one that is used to calculate a sensor offset in the continuous part of the flowchart. This relation can, for instance, be established by determining parameters in a general expression between sensor offset and temperature value using known methods such as "least squares".

Both the sensor signals and temperature signals are preferably filtered using common methods in order to reduce noise levels, torque ripple, torque oscillations or other disturbances on the signals. If a known resonance exists in the system a filter can be designed that reduces or cancels that resonance.

The data pairs are stored in a memory and forms a database that represents the variation of the sensor offset at different temperatures. Every new gearshift, or other occasion when data is collected, results in a new data pair in the database. Before the new data pairs are stored in the data base a control of the stability of the torque signal may be included. If a certain stability criterion is not met the data pair is rejected.

Figure 4:
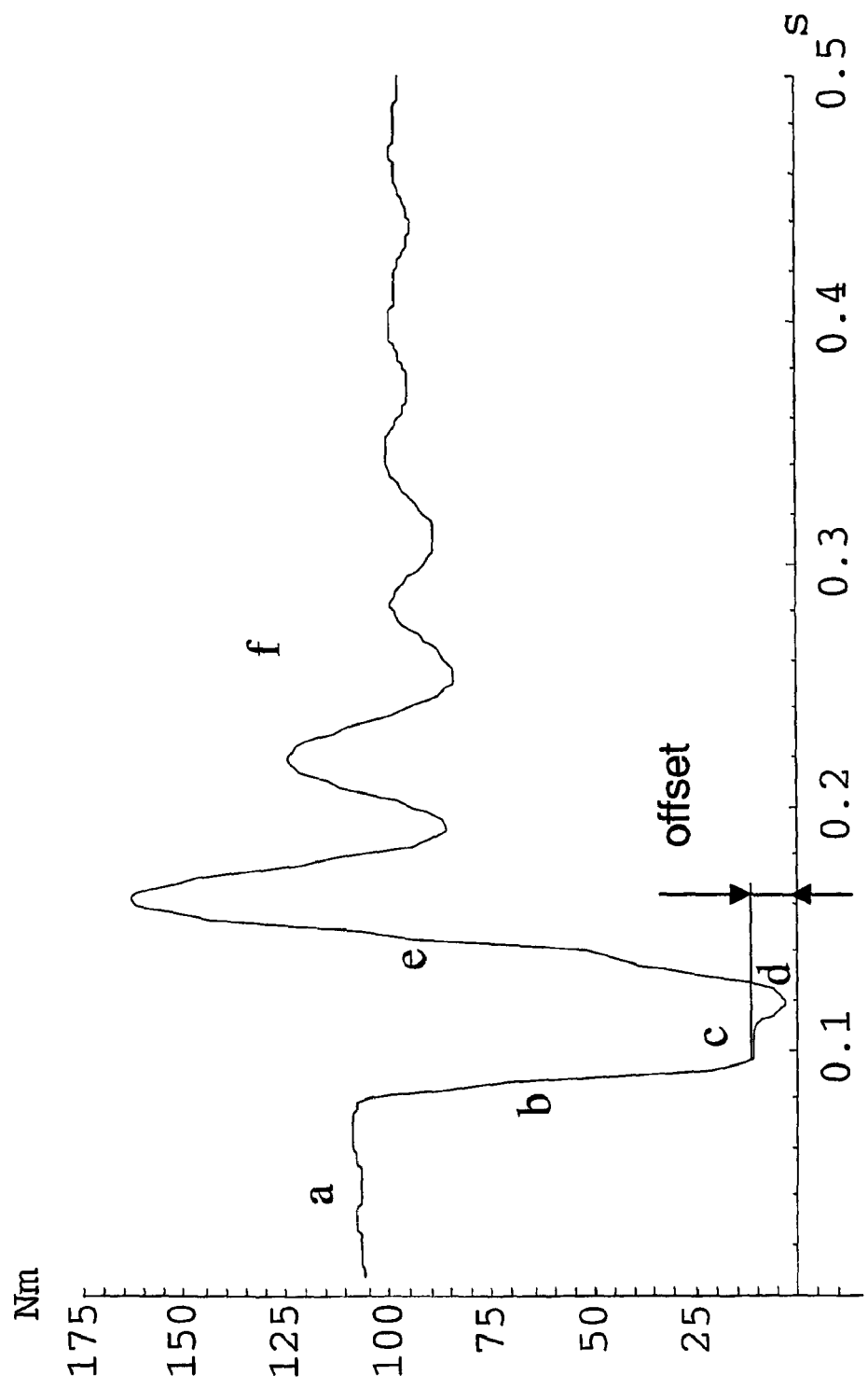
FIG. 4 illustrates a gearshift with an offset of the sensor signal.

FIG. 4 illustrates a typical gearshift of a synchronized gearbox 15 where there is an offset on the sensor signal. The first part a shows the torque level before the gearshift is initiated. In the second part b of the curve the torque level is reduced while the clutch 17 disengages. When the drive train 2 is fully disengaged the drop in torque flattens out for a short period c before the gearshift is operated. At this point the drive train and consequently the torque sensor are unloaded (at zero torque level) and a measurement of the sensor signal and temperature signal can be made and stored in the database. Since the sensor signal in this example has an offset the sensor value at part c of the curve is not equal to zero. The next part of the curve shows how the operation of the gear actuator, not shown, results in a negative bump d in the torque curve when the new gears are accelerated or decelerated. After gear selection the clutch 17 is engaged and the torque from the engine 16 is applied e. The transient of the gearshift usually results in an oscillation in torque that slowly damps out, part f of the curve.

In systems where a gearshift is performed without the use of a clutch 17 the gearshift can be designed such that the gearbox 15 is in neutral position after the first gear is disengaged but before the new gear is engaged. This gives an operation point where the drive train is unloaded and a reading of the sensor output at zero load can be taken. The scheme is also applicable to automatic gearboxes that normally shift gear without any drop in torque. At certain occasions where a gearshift is performed at low load, the gearbox can intentionally be operated through neutral gear in order to give an operation point where the drive train is unloaded and a reading of sensor output at zero load can be taken.

An offset of the sensor output affects the accuracy in the entire operating range, but is most apparent at low loads. In FIG. 4 the offset of the sensor signal is clearly seen in part c of the curve, as a deviation from zero.

Figure 5:
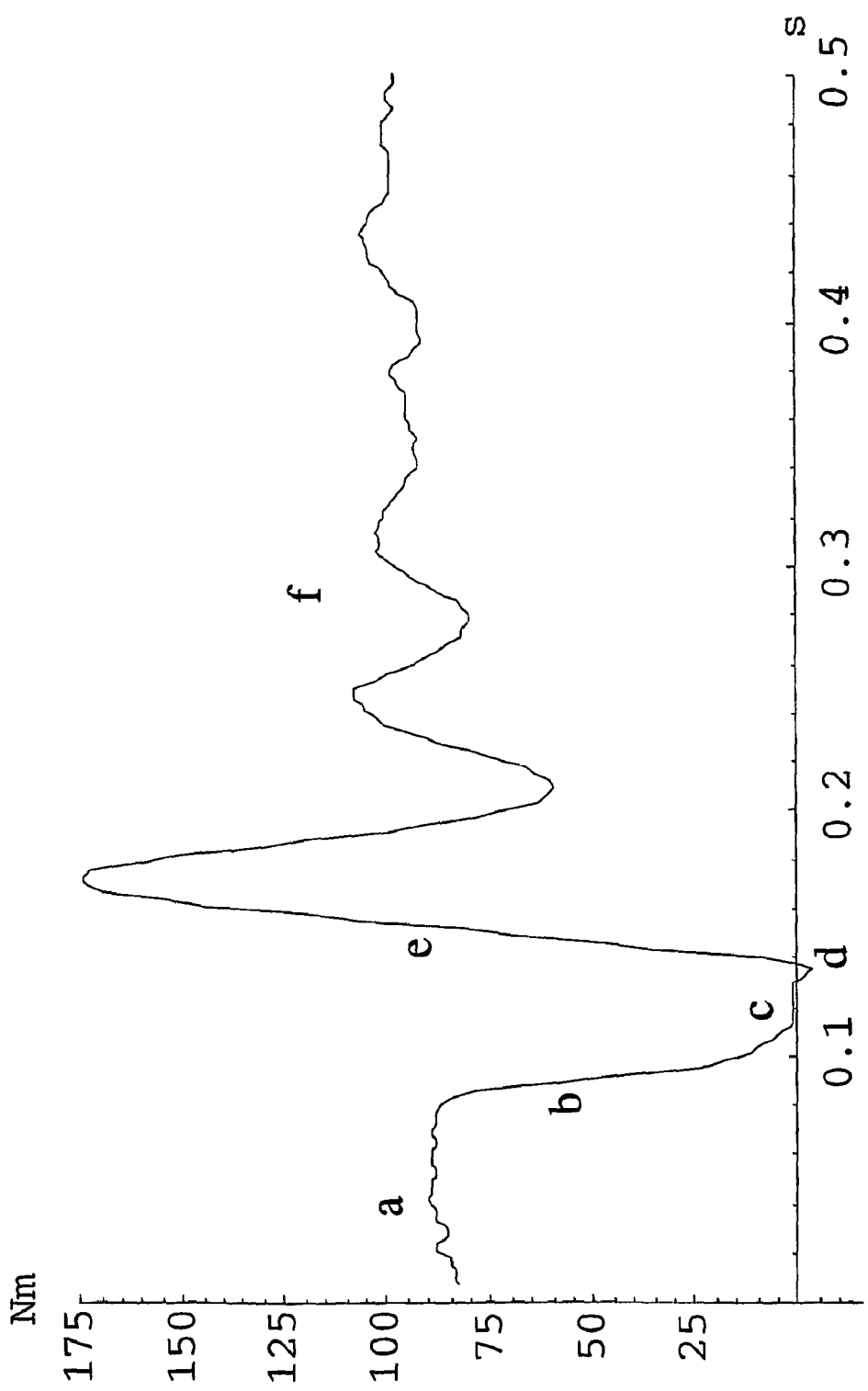
FIG. 5 illustrates a gearshift with a corrected offset of the sensor signal.

FIG. 5 shows an example of a gearshift with corrected offset of the sensor signal, in comparison to the uncorrected offset in FIG. 4. In this example the sensor signal in part c of the curve is almost identical to zero which is the actual value.

Figure 6:
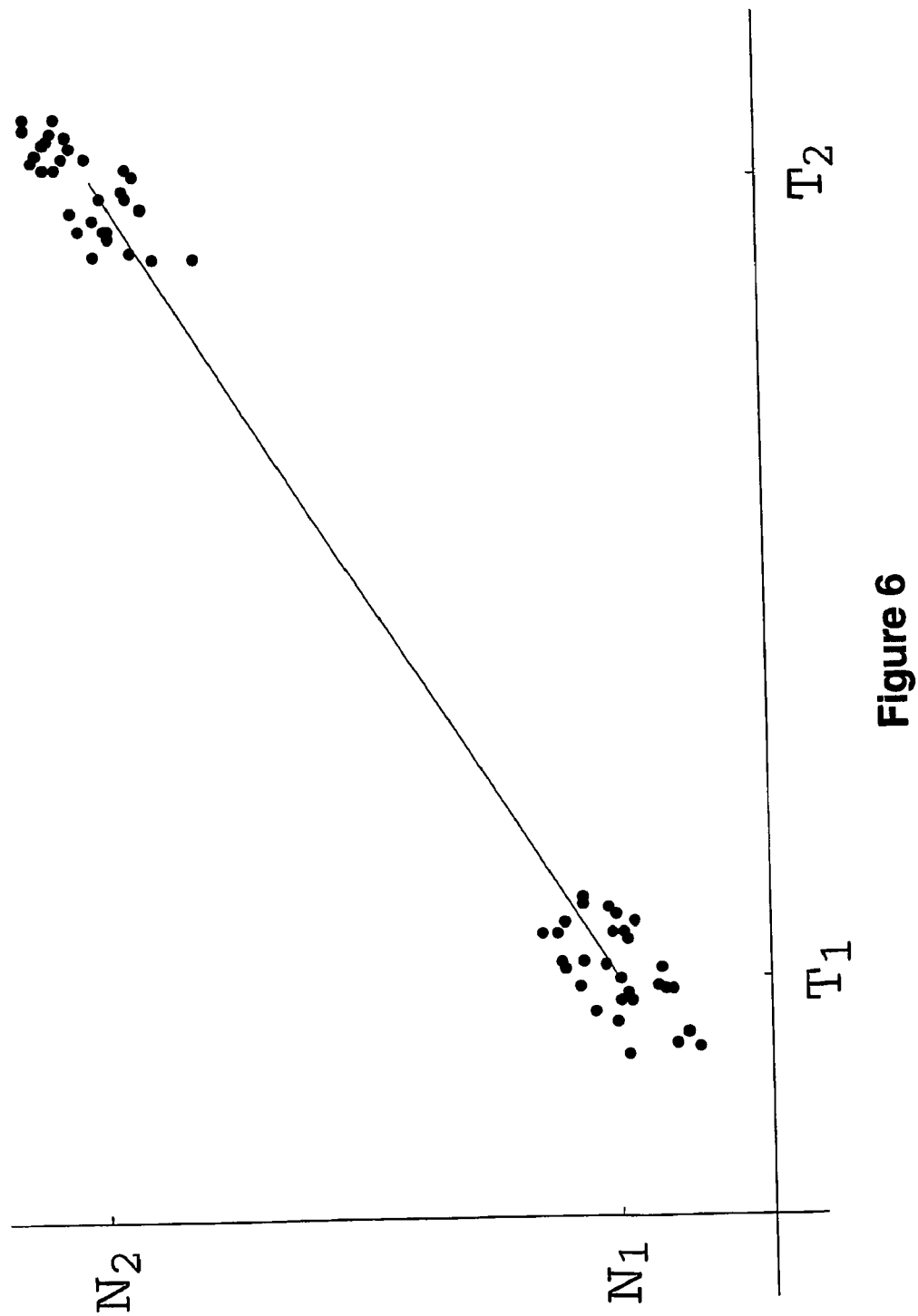
FIG. 6 illustrates measurements of sensor output at zero load at high and low temperatures.

FIG. 6 shows an example of the distribution of measurements of sensor output at low temperatures and high temperatures. The scatter of data pairs at each temperature level is due to uncertainties such as hysteresis, noise, positional movement, temperature gradients and so on. In order to reduce the effect of such uncertainties a number of samples from different occasions are preferably used at each temperature level. The low temperature samples can for instance be taken when the engine is just started before the gearbox components are heated up. The high temperature samples can consequently be taken when the engine has been operated for a while and reached its nominal operating temperature.

By taking temperature samples at a number of different operating points throughout all seasonal variations of the vehicle a model of the sensor performance in the entire operating range can be covered.

Figure 7:
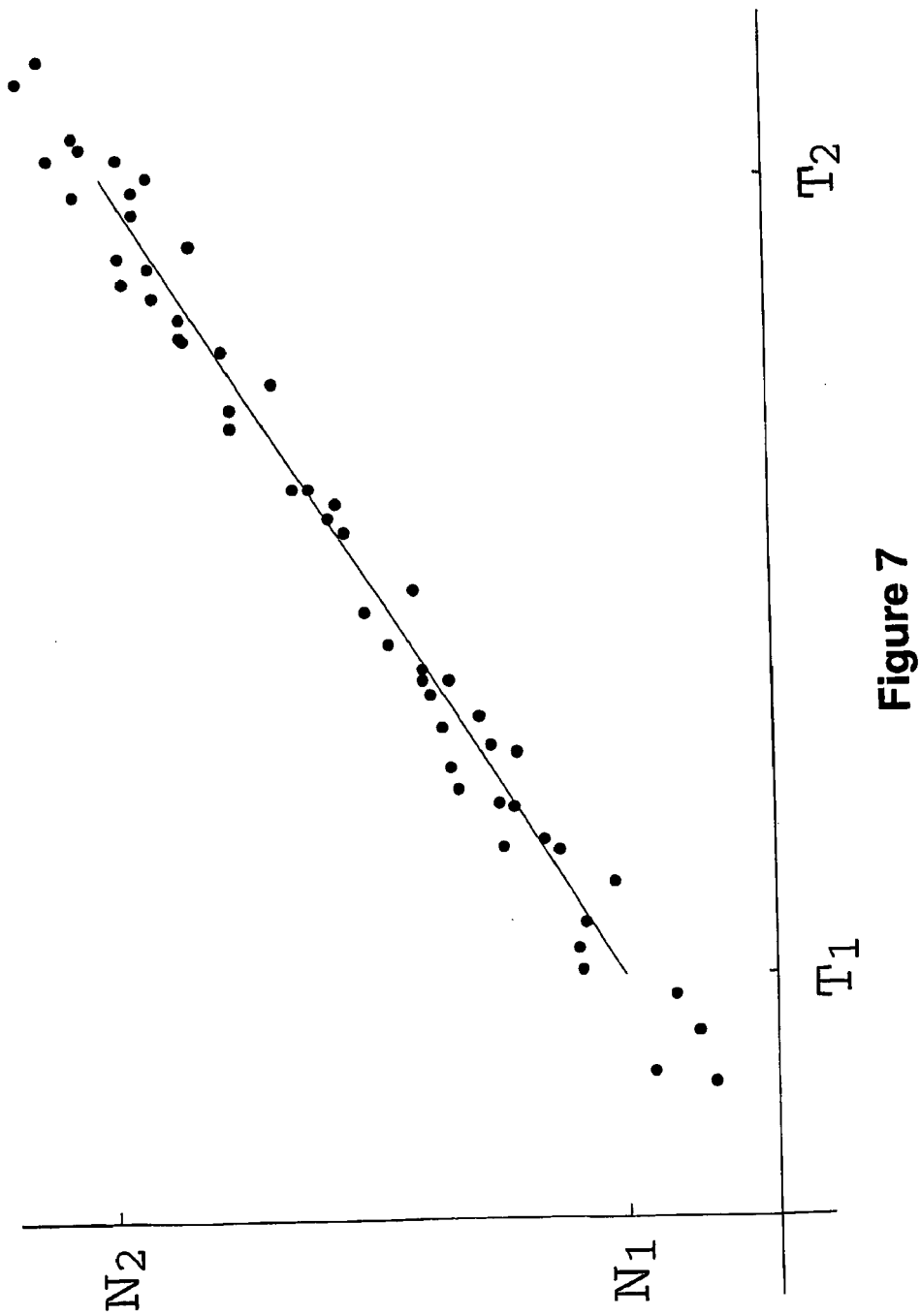
FIG. 7 illustrates measurements of sensor output at zero load at a continuous temperature range.

FIG. 7 shows measurements of sensor output at zero load at a number of different temperatures at continuous temperature range. In this figure a linear relation between sensor offset and temperature is shown.

Figure 8:
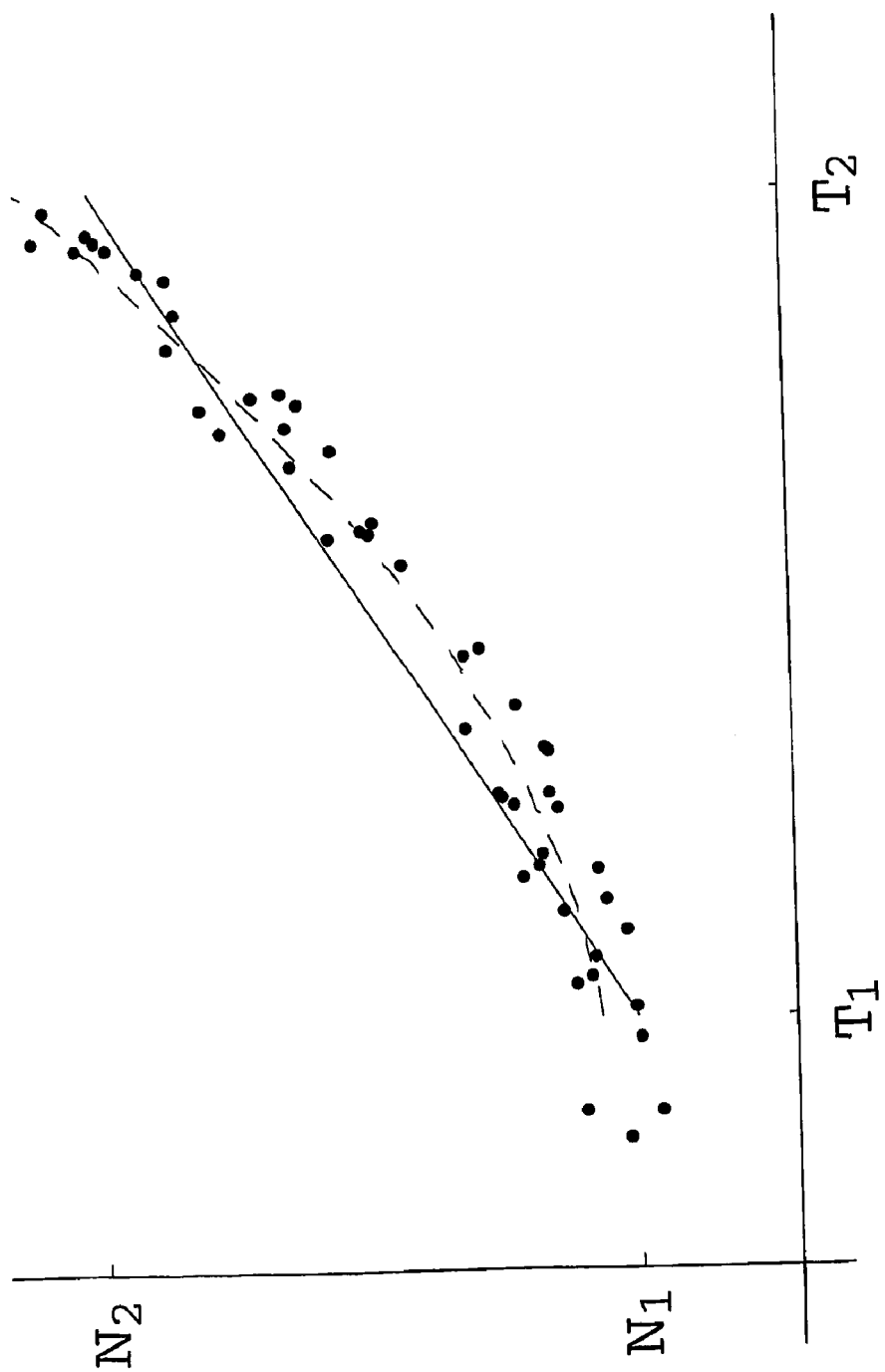
FIG. 8 illustrates measurements of sensor output at zero load at a continuous temperature range with a linear and a higher order sensor model.

FIG. 8 shows measurements of sensor output at zero load at a continuous temperature range with a linear and higher order sensor model.

The model of the sensor offset dependence on temperature drift is determined by calculating parameters in a general expression of the sensor offset with respect to temperature. In its simplest form this is represented by a linear relation depicted with the straight line in FIGS. 6, 7 and 8 and represented by the equation:

$$S_0 = k_0 + k_1 T_s \quad (1)$$

where
$S_0$=calculated sensor offset of the sensor
$k_0$, $k_1$=modeling parameters
$T_s$=sensor temperature The parameters $k_0$, $k_1$ are determined by an optimisation or best fit of the expression in Eq. 1 to the data pairs of sensor signal and temperature signal collected when the drive train is disengaged also shown in FIGS. 6, 7 and 8. If it is of interest to model a more complex relationship between sensor offset $S_0$ and temperature $T_s$ higher order terms can be included in the expression, thereby resulting in several parameters $k_1$ to determine. This gives the possibility to represent a non-linear relationship between sensor offset and temperature illustrated by the dashed curve in FIG. 8.

Common methods to determine a best fit of parameters to a set of data are for instance linear regression schemes or least squares fit. Other schemes are also conceivable. In its simplest form the database is limited to only two data pairs which makes it very straightforward to calculate parameters $k_0$, $k_1$. In this case an additional condition may be required in order to certify that the temperature difference between the two samples is large enough. For such a scheme it may also be required that the parameters $k_0$, $k_1$, are not updated directly, but rather through successive approximations.

By repeating the calculation of parameters $k_1$ every time a gearshift is performed, or every other occasion when the drive train is known to be unloaded, the sensor model according to Eq. 1 is continuously maintained and thereby compensates for long term effects such as aging of the sensor. Old data are preferably shifted out from the database or diminished by a weighing function, which guarantees that the sensor model represents the current characteristic of the sensor.

In the preferred embodiment the temperature signal 8a is calculated in the temperature calculation unit 8 based on characteristics of the primary circuit of the sensor 1. Readily available signals from the excitation unit 2 are the excitation current and the excitation voltage. The measured values of the excitation current and excitation voltage can be combined in order to form the impedance of the sensor 1 according to the equation:

$$Z_P = \frac{U_P}{I_P} \qquad (2)$$

where $Z_p$=impedance of the primary circuit of the sensor
$U_p$=excitation voltage of the primary circuit of the sensor
$I_p$=excitation current of the primary circuit of the sensor Since the impedance of the primary circuit is a function of temperature resulting from resistivity drift of the primary windings of the sensor 1 and temperature dependent reluctance of the shaft, resistivity drift of the shaft, copper pattern, temperature dependant permeability and residual stresses in the surface an expression for the sensor 1 temperature can be formed based on the impedance of the primary circuit, which in its simplest form is a linear relationship according to the equation:

$$T_s = k_t (Z_p - Z_0) \qquad (3)$$

where $T_s$=calculated temperature of the sensor
$k_t$=temperature coefficient
$Z_p$=impedance of the primary circuit of the sensor
$Z_0$=impedance at zero/calibration temperature In a more refined implementation or for large temperature ranges higher order terms equations may be included in the relation between sensor temperature and impedance of the primary circuit. At a general level the relation between temperature and impedance can be represented by any suitable function.

Figure 9:
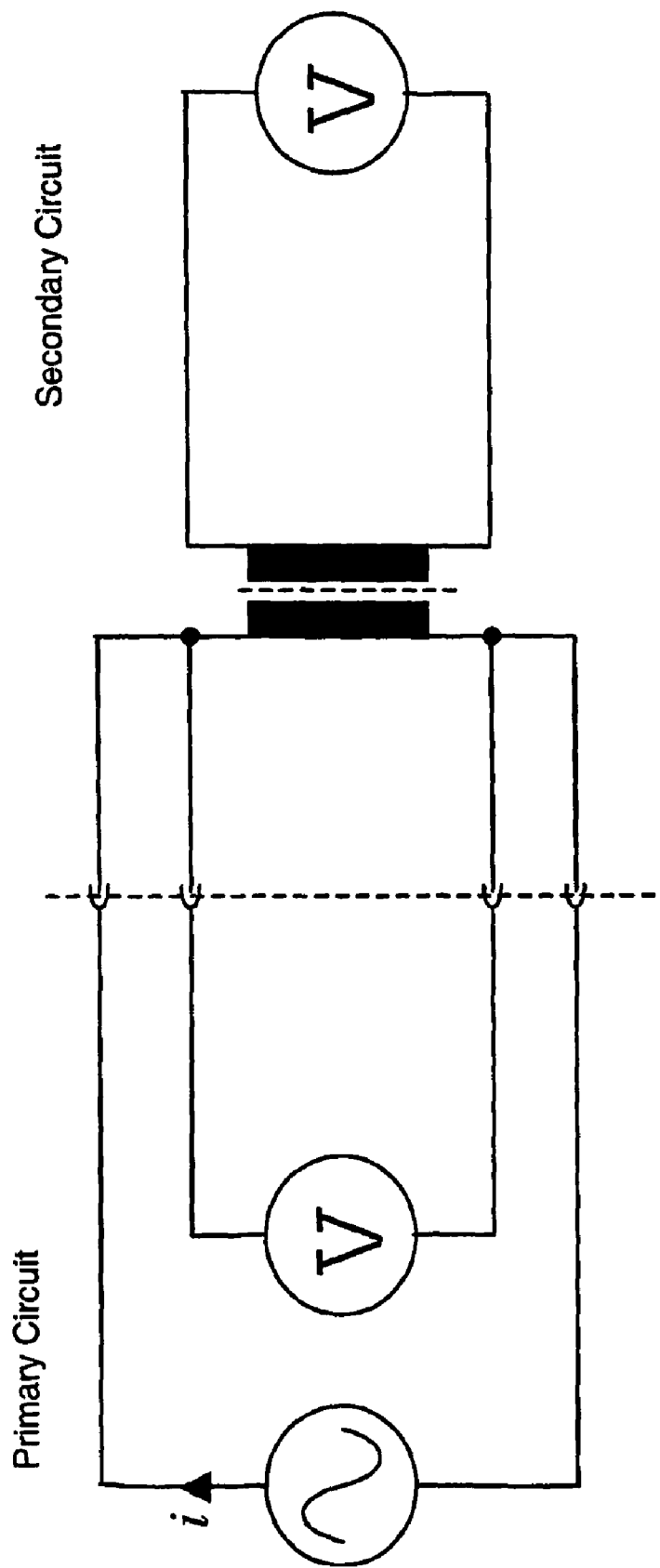
FIG. 9 illustrates a four-wire measurement of the impedance of the primary circuit of the sensor.
Figure 10:
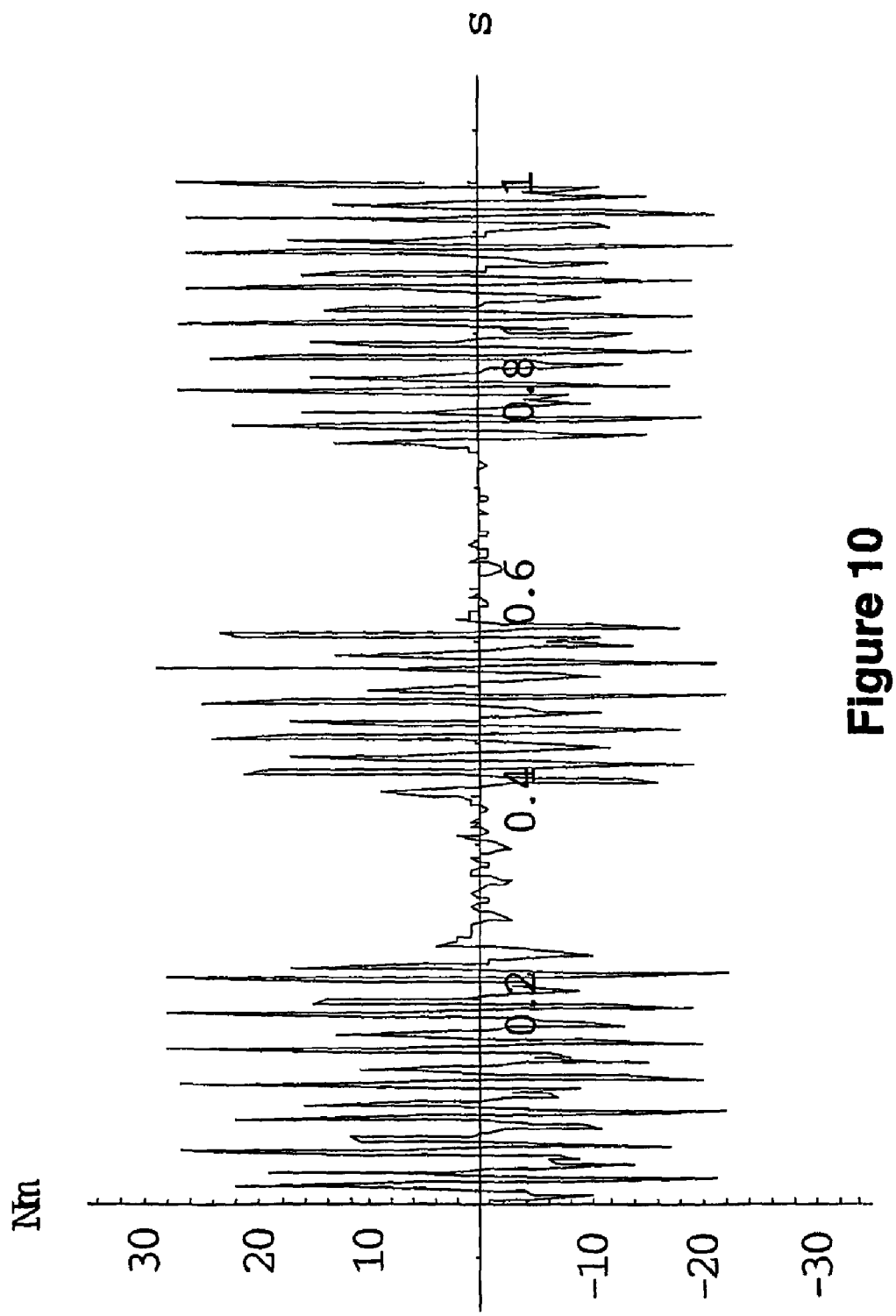
FIG. 10 illustrates the variation in torque ripple with engine engaged and disengaged.

The supply voltage and supply current can be measured directly in the excitation unit 4 of the sensor 1 as indicated in FIG. 1. However, in order to minimize the influence of cable and contact resistances in the connection between excitation unit 4 and the sensor 1 the voltage measurement is preferably made as close as possible to the sensor 1 with a four wire measurement of the impedance. In a four wire measurement the voltage is measured in a pair of leads that are separate from the pair of leads that supplies the current, see FIG. 9. No or very little current flows through the pair of leads over which the voltage is measured.

The excitation voltage and excitation current are time varying signals and can as such be represented by an amplitude and a phase angle. This gives a complex representation of the impedance consisting of a resistive part and a reactive part. Their representation in equation 2 can be real numbers representing the amplitude of the signals or complex numbers representing both amplitude and phase angle. Other measures that represent the curve forms of the signals can also be used.

Furthermore, the characteristics of the primary circuit may also be represented by the inverse of the impedance or other combinations of excitation voltage and excitation current.

In order to minimize the influence of the mechanical load on the temperature signal, the representation of impedance in equation 3 can be chosen at the phase angle that has the least influence of applied load. In a complex representation of the impedance it is observed that the influence of the applied load affects the impedance signal at a different phase angle than the effect of a different temperature.

However, for certain reasons it can be favorable to work with a representation of impedance that is influenced by both temperature and load. An example of such a representation is the amplitude of the impedance. In these cases the performance of the temperature signal can be greatly improved by a linearization or compensation that eliminates or minimises the effect of load based on either signal 10a or signal 13a in FIG. 1.

The preferred torque sensor 1 is of the magnetostrictive type according to U.S. Pat. No. 5,646,356 or pending US application 2002189372.

Another way of detecting zero torque level in a transmission is to further process the achieved torque signal and follow the change in torque during disengagement of the clutch. As can be seen in FIG. 5 there is a very abrupt change in the slope of the torque signal when the reduction in torque in part b flattens out in part c. This transition can easily be detected by observing the derivative of the torque signal or by other means that detects the change in slope and the sharp change between the two phases.

Another characteristic that can be used to detect that the drive train is disengaged is the change in ripple content of the torque signal. Due to the individual combustions from the engine the torque signal has a steady amount of torque ripple or oscillations superimposed on the net torque output when the drive train is mechanically connected to the engine. This torque ripple is dramatically reduced when the engine is disengaged. This change in ripple content can therefore be used as a means to detect whether the drive train is engaged or disengaged from the engine.

A further means to detect zero torque level of the drive train can be used even without operation of the gearbox. When the engine and drive train is operated close to zero load shifting from negative to positive load or vice versa, the part where the drive train goes through the backlash or play in the drive train can be detected in the torque signal as a phase where the change in torque flattens out. This is clearly seen as plateaus in the torque signal when it goes through the play or backlash in the transmission.

Figure 11:
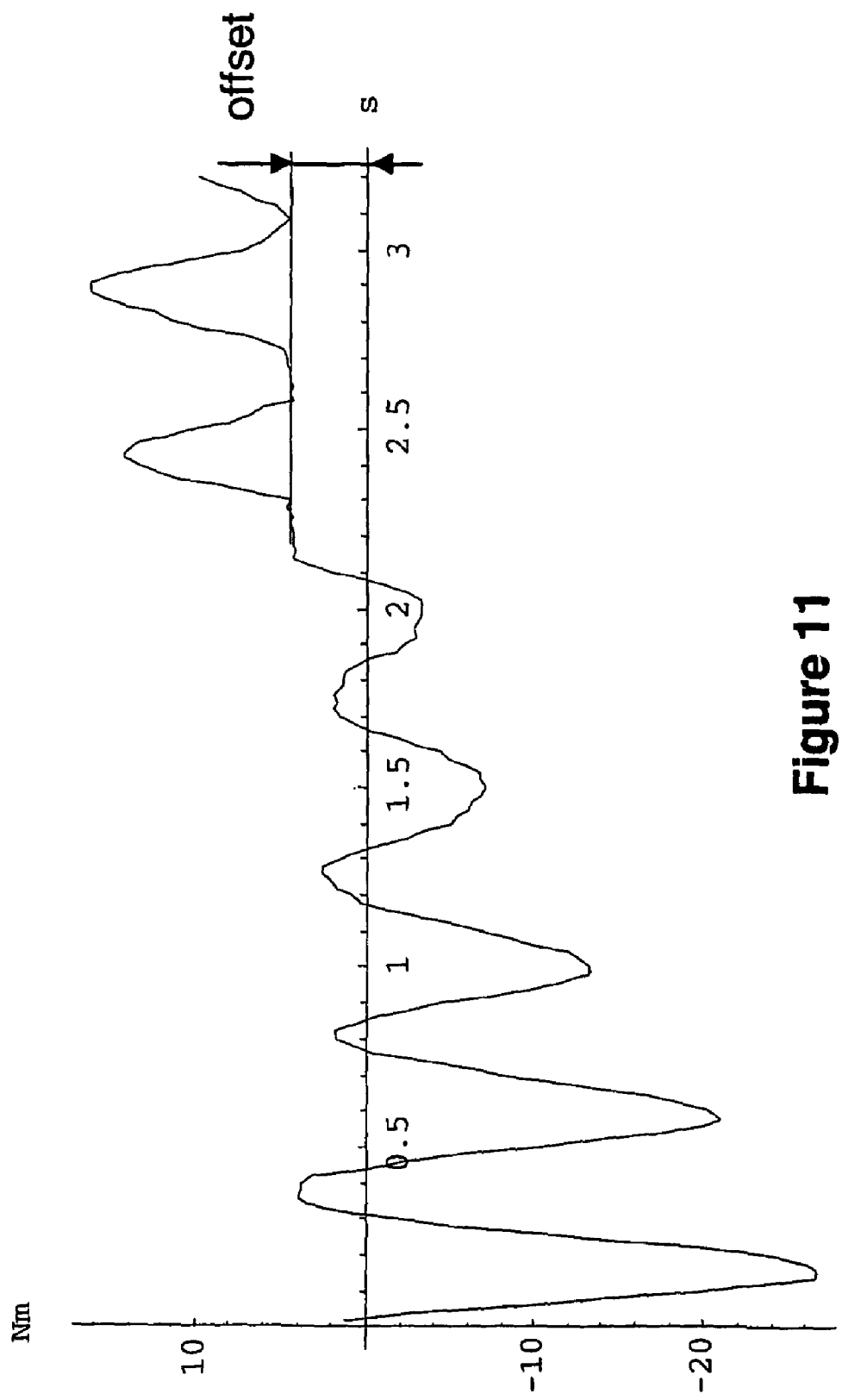
FIG. 11 illustrates the torque variation around zero indicating play in the transmission.

In FIG. 11 these plateaus appear at a level different from zero which indicates the offset of the sensor signal. In the part where the torque flattens out according to the above description the load of the drive train is known to be unloaded.

Any of the methods above can be used for a detection of zero load in the transmission either on its own, in combination or in combination with a trigger signal from the gearbox control unit.

In another embodiment of the invention the temperature signal used in equation 1 may be composed not only of the temperature signal calculated from the primary circuit of the sensor according to equation 3, but also of other temperature signals that are known by the supervising control system as well as temperature signals from other external temperature sensors.

It is noted that while the above describes exemplifying embodiments of the invention, there are several variations and modifications which may be made to the disclosed solution without departing from the scope of the present invention as defined in the appended claims.

Therefore the invention may also be applied for adaptive compensation of the temperature drift of a force sensor in a mechanical equipment or a process line such as a steel mill or a paper mill. A force sensor in such an equipment may be used for instance to measure roll force or web tension of the steel sheet or paper web. An example of naturally occurring points of operation where the sensor is unloaded for these applications exists after the sheet or web exits the process line and before a new sheet or paper web enters.

The invention may also be applied for a torque sensor or a force sensor for other applications in the automotive industry, in other industrial applications or applications in other areas which exhibits the nature of an intermittent operation with naturally occurring points of operation where the sensor is unloaded, close to unloaded or at a known load level where these points of operation can by any means be either controlled or detected.

The invention claimed is:

1. A method for adaptive compensation of a temperature drift of a sensor, designed to measure the torque of a shaft or a drive train or the force in a mechanical equipment, during operation, the method comprising:
   recurrently measuring the sensor signal and determining an associated temperature with a calculation unit,
   calculating an offset value as a function of temperature based on measured data and a model of a sensor offset,
   compensating with the calculating unit the measured sensor signal value using said calculated offset value, and
   detecting with a supervisor system when the sensor is unloaded or nearly unloaded and if so storing the sensor signal value and the associated temperature value in a memory and updating the model of the sensor offset based on the stored sensor signal value and the associated temperature.

2. The method according to claim 1, further comprising: detecting when the sensor is unloaded based on a signal from a control unit or a control system.

3. The method according to claim 1, further comprising: detecting when the sensor is unloaded based on the position of a switch.

4. The method according to claim 1, further comprising: detecting when the sensor is unloaded by monitoring characteristics of the sensor signal.

5. The method according to claim 1, further comprising: detecting when the sensor is unloaded by monitoring the change/transition in torque and/or the slope of the torque.

6. The method according to claim 1, further comprising: detecting when the sensor is unloaded by monitoring the change in ripple content of the torque signal.

7. The method according to claim 1, further comprising: detecting when the sensor is unloaded by monitoring when the change in torque flattens out in the transmission.

8. The method according to claim 1, further comprising: determining that the temperature signal based on properties of a primary circuit of the sensor.

9. The method according to claim 1, further comprising: determining that the temperature signal based on the current, voltage and/or impedance of a primary circuit of the sensor or a combination thereof.

10. The method according to claim 1, further comprising: utilizing temperature signals from external temperature sensors.

11. The method according to claim 1, further comprising: filtering the data in order to reduce disturbances on the signals such as noise, torque ripple and/or torque oscillations.

12. A logic circuit configured to carry out a method according to claim 1.

13. A system for adaptive compensation of the temperature drift of a sensor, designed to measure the torque of a shaft or a drive train or the force in a mechanical equipment, during operation, the system comprising:
   measuring means for recurrently measuring the sensor torque and an associated temperature,
   calculating means for calculating an offset value of the sensor as a function of temperature based on the measured and a sensor model,
   compensating means for compensating the sensor signal value using said calculated offset value,
   detecting means for detecting when the sensor and/or drive train is unloaded and if so storing these data in a memory, and
   updating means for updating the sensor model based on the stored data thereby minimizing the offset of the sensor signal.

14. A computer readable medium embodying a computer program product, said computer program product, comprising: computer program instructions recorded on the computer readable medium and executable by a processor for carrying out the steps of a method comprising recurrently measuring the sensor signal and determining an associated temperature, calculating an offset value as a function of temperature based on measured data and a model of the senor offset, compensating the measured signal value using said calculated offset value, and detecting when the sensor is unloaded or nearly unloaded and if so storing the sensor signal value and the associated temperature value in a memory and updating the model of the sensor offset.

15. The computer program product according to claim 14 wherein the computer program instructions are further for at least partially providing the computer program instructions through a network.

16. The computer program product according to claim 15, wherein network is the Internet or an intranet.

* * * * *